(12) United States Patent
Leeper

(10) Patent No.: US 8,186,828 B2
(45) Date of Patent: May 29, 2012

(54) PRISM GLASSES WITH MOVABLE LENSES AND DETACHABLE TEMPLES

(75) Inventor: Barry Leeper, Deerfield Beach, FL (US)

(73) Assignee: Scan Sound Inc., Deerfield Beach, FL (US)

( * ) Notice: Subject to any disclaimer, the term of this patent is extended or adjusted under 35 U.S.C. 154(b) by 190 days.

(21) Appl. No.: 12/485,187

(22) Filed: Jun. 16, 2009

(65) Prior Publication Data

US 2010/0315587 A1 Dec. 16, 2010

(51) Int. Cl.
G02C 5/14 (2006.01)
G02C 7/02 (2006.01)
G02C 5/00 (2006.01)
A61B 5/05 (2006.01)

(52) U.S. Cl. ............... 351/159.58; 351/111; 351/112; 351/121; 351/154; 351/116; 600/411

(58) Field of Classification Search ............ 351/50, 351/41, 116, 47, 158, 159.58, 111–112, 121, 351/154; 359/480–482, 835
See application file for complete search history.

(56) References Cited

U.S. PATENT DOCUMENTS

| 2,123,682 | A | | 7/1936 | Wingate | 88/41 |
|---|---|---|---|---|---|
| 2,147,448 | A | * | 2/1939 | Lee | 351/229 |
| 4,077,703 | A | | 3/1978 | Pablo | 350/145 |
| 4,792,223 | A | | 12/1988 | Axelbaum | 351/158 |
| 4,804,261 | A | | 2/1989 | Kirschen | 351/158 |
| 5,042,910 | A | | 8/1991 | Dolezal | 359/480 |
| 5,170,190 | A | * | 12/1992 | Berke | 351/43 |
| 5,173,720 | A | | 12/1992 | Lee et al. | 351/50 |
| 6,280,031 | B1 | | 8/2001 | Zerkle | 351/158 |
| 6,834,952 | B2 | * | 12/2004 | Polovin | 351/116 |

OTHER PUBLICATIONS

Scan Sound Prism Glasses with fixed lenses, Jan. 1993, at www.scansound.com/prism-glasses.htm.

* cited by examiner

*Primary Examiner* — Ricky Mack
*Assistant Examiner* — Zachary Wilkes
(74) *Attorney, Agent, or Firm* — Robert C. Kain, Jr.

(57) ABSTRACT

The prism glasses include movable prism lenses and, optionally, detachable temples. The movable lenses permit the user to alter the viewing angle from substantially 90 degrees downward to substantially 90 degrees upward. The glasses include a planar frame plate, a bridge, a forward outboard face and view ports therethrough. Two prisms, one for each view port, transmit the image. Prism frames have mounting elements for attachment and detachment to complementary mount elements on the frame. The mounts permit either rotation or removal and re-insertion on the frame. In a first mode of operation, the prism transmits a 90 degrees image. The prism mounts cooperate with the complementary frame mounts and the prism lenses can be (a) removed and re-positioned at a 180 degrees position or (b) moved 180 degrees from the downward 90 degree viewpoint to an upward 90 degree viewpoint to the second operational mode.

15 Claims, 5 Drawing Sheets

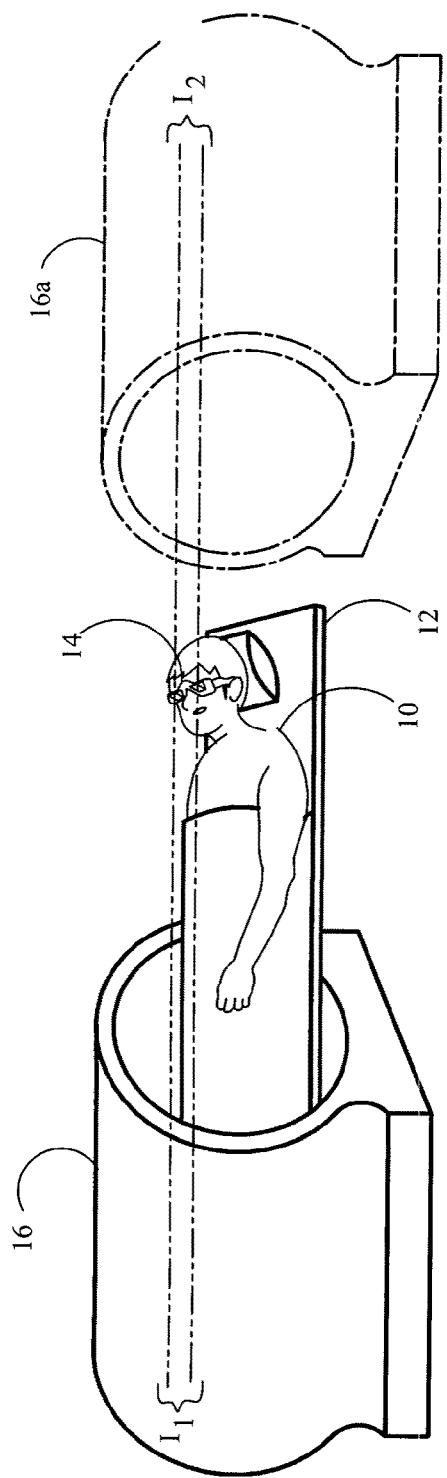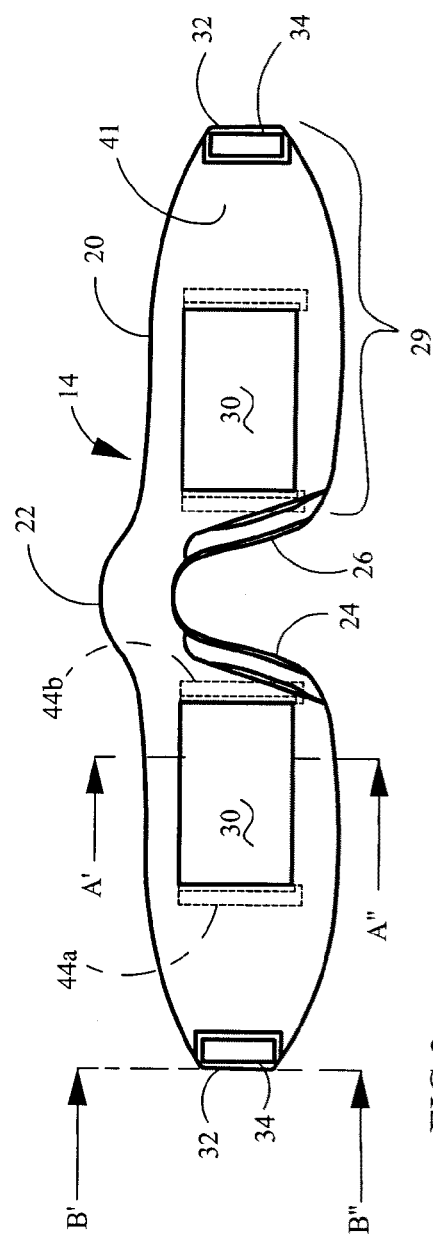
FIG.1
FIG.2

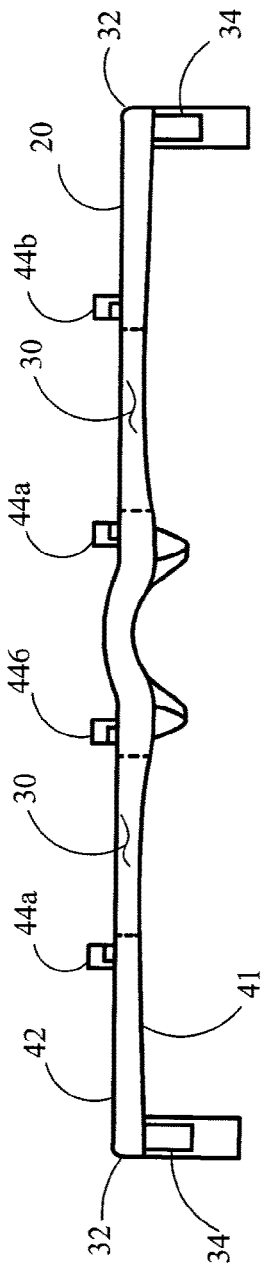
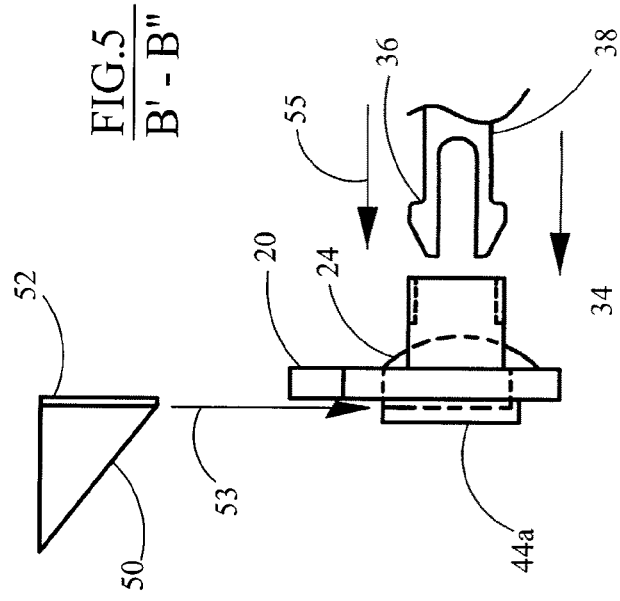
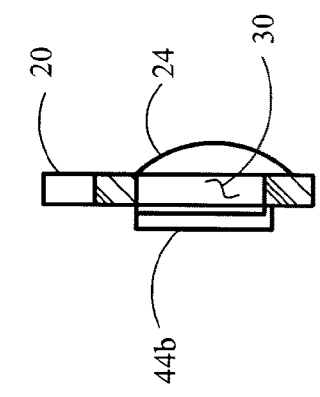
FIG. 3
FIG. 4
A'-A"
FIG. 5
B'-B"

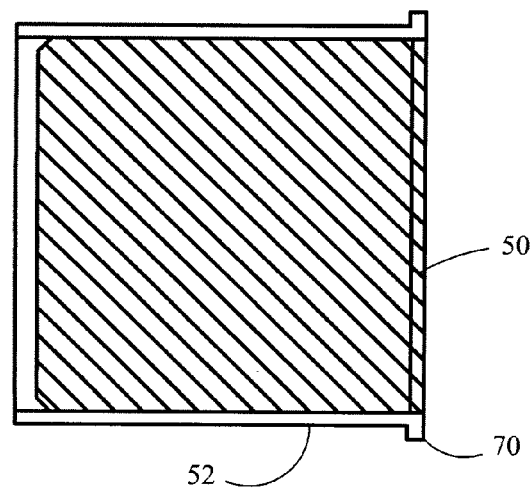
FIG. 8
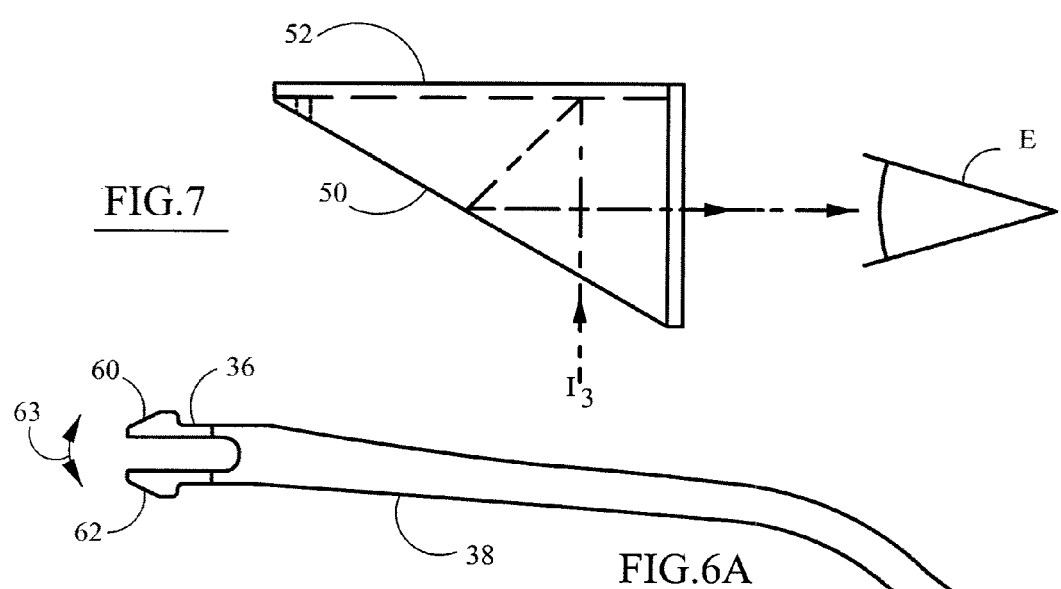
FIG. 7
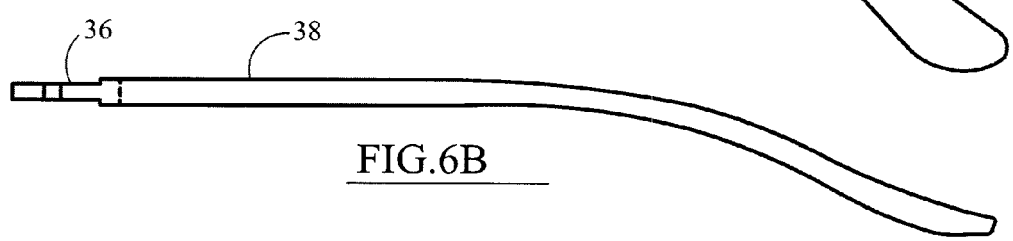
FIG. 6A
FIG. 6B

C' — C"

PRISM GLASSES WITH MOVABLE LENSES AND DETACHABLE TEMPLES

The present invention relates to prism glasses wherein the user can view images 90 degrees downward or 90 degrees upward by moving the prism lenses on the eyeglass frame. Also, the present invention relates to prism glasses with detachable temples.

BACKGROUND OF THE INVENTION

Prism glasses, and particularly glasses made only of plastic or non metallic, non-ferrous (non-magnetic) material, are used in many situations including, but not limited to, reducing the claustrophobic feeling when a user is subjected to an MRI procedure. During this procedure, the user typically lies flat on his or her back and his or her body is inserted either feet first or head first into a large cylindrical MRI container which generally makes considerable noise during the MRI procedure. When the user wears prism glasses, the user can see either images downward at the user's feet or upward beyond the user's head. Technicians may converse with the users or the users may view a film or other visual distraction at the user's feet or beyond the user's head. Of course, if the user is lying on his or her back, the image is "down" in the direction of the user's feet or "up" above the user's head. Herein, the point of reference for up and down is the eyeglass frame resting on the user's nose.

One prior art device employs an eyeglass frame where the prism lenses are permanently mounted in a fixed manner on the frames and the user's view is always 90 degrees downward.

U.S. Pat. No. 4,804,261 to Kirschen shows Anti-Claustrophobic Glasses. The Kirschen patent uses angled mirrors that causes image reversal. Also, the mirror angle is not fixed in the Kirschen system so adjustment of the mirror angle to capture the correct image view is time consuming and problematic as angle could change due to vibrations, gravity, and patient movement. An incorrect mirror angle will prevent the patient from seeing intended image target. Further, the Kirschen mirror system may come out of adjustment, that is, change its angular view, during the MRI scan due to MRI system vibration, patient movement or a loose mirror unit. The term MRI as used herein refers to Magnetic Resonance Imaging (MRI), or nuclear magnetic resonance imaging. Kirschen has a back surface mirror mounted on spectacle frame which is attached to the patient's head with an adjustable elastic band. The elastic band requires adjustment for every patient, which takes time and, if not adjusted correctly, could be uncomfortably tight or too loose, causing misalignment of the angled mirror, changing the person's view of the intended target. It is not easy to clean the elastic band that comes in contact with patient hair, potentially enabling the spread of lice, viruses, bacteria and germs U.S. Pat. No. 5,173,720 to Lee is a Field of View Changer so patients can go in Head-First or Feet-First into the MRI cylinder and maintain visual contact outside the bore to see a projection screen, mural, technologist or friendly face.

OBJECTS OF THE INVENTION

It is an object of the present invention to provide prism glasses with movable lenses such that the user, or an assistant to the user, can alter the viewing angle from substantially 90 degrees downward to substantially 90 degrees upward by removing the lenses or altering the position of the lenses with respect to the eyeglass frame and the viewing port. The user's eyes, when looking straight forward, view images through the frame view ports (left and right ports). Alternatively, the prism lenses may rotate on the frame in the plane of the eyeglass frame plate.

It is a further object of the present invention to provide clip-on temples for prism glasses.

It is another object of the present invention to provide prism glasses wherein and prism mounted in the prism frame can be rotated to alter the viewing angles from 90 degrees downward to substantially 90 degrees upward.

Another object of the present invention is to utilize a wrap around strap rather than detachable temples.

SUMMARY OF THE INVENTION

One embodiment of the prism glasses includes movable prism lenses and detachable temples wherein the movable lenses permit the user to alter the viewing angle from substantially 90 degrees downward to substantially 90 degrees upward. The detachable temples (an optional feature) permit the user to selectively attach temples on the eyeglass frame or to use a clip-on strap rather than the detachable temples. This feature enables the prism glasses to fit large or small adult heads or smaller child heads. The prism glasses with movable prism lenses and detachable temples includes an eyeglasses frame having a generally planar frame plate and a bridge centrally located in the frame plate. The bridge is adapted to rest the frame on an user's nose. Frame end pieces are disposal at terminal ends of the frame plate. The frame plate has a forward facing outboard face or surface and the plate defines view ports as through passages on opposite sides of the bridge. Two detachable temples each have a releasable lock end piece at one end. The frame plate end pieces have complementary end lock elements which are complementary to the releasable lock end piece on the temples. Two prisms, one for each view port, transmit an image 90 degrees from an image source into the view port and hence the user's eyes. Each prism has a prism frame with prism frame mount elements thereon to permit removable attachment and detachment to and from said eyeglasses frame. Alternatively, the prism frame mounts move or rotate with respect to the frame to re-position the prism lenses 180 degrees. The glasses frame has a pair of complementary mount elements disposed about the through passages on said forward facing outboard face of the frame plate. The complementary frame mounts are complementary to the prism frame mounts. In this manner, the prism glasses have at least first and second modes of operation. In a first mode, each said prism transmits a downwardly disposed image 90 degrees through the view ports. The prism frame mount elements cooperate with the complementary frame plate mount elements and permit the prism lenses to be (a) removed and re-positioned at a 180 degrees position or (b) moved 180 degrees from the downward 90 degree viewpoint to an upward 90 degree viewpoint. Therefore, in the second mode, each prism transmits an upwardly disposed image 90 degrees through the respective view port. The prism frame mounts and the eyeglasses frame mounts may be one of a lip interlock with a channel such that the lenses slide up or down with respect to the frame enabling the lenses to be removed and re-inserted into the lip-channel interlock; a circular prism frame with a lip-channel mount for 180 degree rotation; a tongue and groove mount system which operates similar to the lip and channel system; an interference fit between the prism frame mount elements and the complementary frame plate mount elements; tabs interlocking with tab lock capture channels such that the lenses clip onto the tab lock capture channels (and can be removed therefrom by a lateral force); snap in tabs interlocking with capture channels; detents and indent interlocks (operating like a ball and socket click-in system); and interfacing threads on the prism frame mount elements and the complementary frame plate mount elements (male and female threads) permitting the lens frames to be screwed into the eyeglasses frame.

BRIEF DESCRIPTION OF THE DRAWINGS

Further objects and advantages of the present invention can be found in the detailed description of the preferred embodiments when taken in conjunction with the accompanying drawings in which:

FIG. 1 diagrammatically illustrates a user or a patient viewing a downward image I1 when the user is moved feet first into a large MRI unit or, in an alternative mode, the user views image I2 which is above the user's head. The upward 90 degree viewpoint may be used when the user is put head first into an MRI unit;

FIG. 2 diagrammatically illustrates the eyeglasses frame of the present invention and, more particularly, a view of an inboard or interior surface of the frame plate;

FIG. 3 diagrammatically illustrates a top view of the eyeglasses frame in accordance with the principles of the present invention;

FIG. 4 diagrammatically illustrates a partial view of the frame from section line A'-A" in FIG. 2;

FIG. 5 diagrammatically illustrates the eyeglasses frame with a removable prism lens in a prism lens frame as well as the removable temples from the perspective of section line B'-B" in FIG. 2.

FIG. 6A and FIG. 6B diagrammatically illustrate a side view and a top view of one of the temples for the eyeglasses;

FIG. 7 diagrammatically illustrates optics of the prism in conjunction with image I3 at a 90 degree view angle compared with the user's eye E;

FIG. 8 diagrammatically illustrates the prism in the prism frame;

DETAILED DESCRIPTION OF THE PREFERRED EMBODIMENTS

Figure 9:
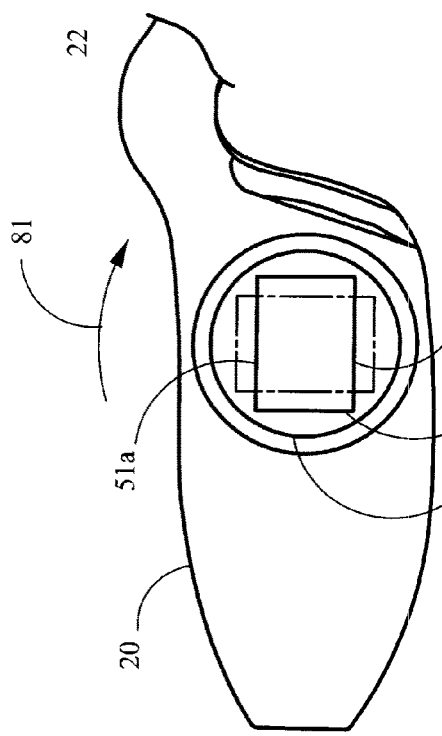
FIG. 9 diagrammatically illustrates an alternate embodiment of the invention wherein the prism and prism frame is rotatably mounted with respect to the eyeglass frame (permitting 180 degree rotation in the eyeglass frame plane)

The present invention relates to prism glasses with movable lenses such that the user can alter the viewing angle from substantially 90 degrees downward to substantially 90 degrees upward. Another feature of the present invention is a detachable temple.

FIG. 1 diagrammatically illustrates a user or a patient viewing a downward image I1 when the user is moved feet first into a large MRI unit or, in an alternative embodiment, the user views image I2 which is above the user's head when the user is put head first into an MRI unit. User 10 is lying on movable bed 12. User 10 is wearing eyeglasses 14. With respect to MRI unit 16, user 10 on bed 12 is moved inward into the opening or core of MRI 16, feet first. In one instance, the user may see image I1 which is downward and further beyond the feet of the user. In another instance, user 10 may see image I2 which is outboard of MRI unit 16 and beyond the MRI cavity. Alternatively, user 10 may be inserted into alternate MRI unit 16a in a head first manner. Similarly, depending upon the configuration of the prism lenses in prism glasses 14, the user may see image I2 which is above the head of the user or may see image I1 which is laterally disposed downward past the user's feet.

FIGS. 2-8 diagrammatically illustrate several aspects of the present invention. These aspects include a removable prism lenses such that the user can alter his or her view from 90 degrees downward to 90 degrees upward (from I1 to I2 in FIG. 1). Further, FIGS. 2-8 diagrammatically illustrate removable temples. Similar numerals designate similar items throughout the drawings. Eyeglasses 14 include a generally planar frame plate 20. Frame plate 20 includes a centrally located bridge 22 and opposing but facing nose pads 24, 26. The left segment 27 of eyeglasses 14 is substantially similar to the right segment 29, that is, one segment is a mirror of the other segment. Eyeglasses 14 include viewing ports 30 on opposite sides of bridge 22. The terminal ends 32 of frame plate 20 have, in the illustrated embodiment, end lock elements 34 which are complementary to releasable lock end elements 36 (FIG. 5) of temples 38.

In the illustrated embodiment of FIG. 2, eyeglass frame 20 includes a rear or inboard surface 41. The frame 20 includes front facing or outboard surface 42. Outboard surface 42 and inboard surface 41 are best shown in FIG. 3.

FIG. 3 shows a plurality of mount elements 44a, 44b which oppose each other and protrude from front face 42 of eyeglass frame 20.

FIG. 4 shows that frame mount 44b extends the vertical distance of view port 30. This frame prism mount assures that once the prism is mounted by insertion into the frame, the viewing angle is always proper.

FIG. 5 diagrammatically shows that prism lens 50, which is mounted in prism frame 52, is insertable in frame mount 44a as noted by directional arrow 53. Further, FIG. 5 shows that releasable lock end piece 36 of temple 38 is insertable as noted by arrow 55 into complementary end lock element 34 on glasses frame 20. FIG. 5 shows lip-channel mount system.

FIG. 6A shows that, in one embodiment, the releasable lock end piece 36 includes tab ends 60, 62 which permit flexible tab action in the direction of double headed arrow 63 such that releasable lock element 36 can be pushed together as noted by arrow 55 in FIG. 5 and inserted and removed into complementary end lock element 24 of frame 20.

FIG. 6A is a side view of temple 38 and FIG. 6B is a top view of temple 38. Of course, the eyeglasses have two temples just as the eyeglasses have two prism lenses mounted in respective prism frames. To achieve an absolute correct viewing angle, the prisms must be positioned over view ports 30.

FIG. 7 shows that the user's eye E sees image I3 at a substantially 90 degree angle due to reflection and refraction in prism 50. Prism 50 is mounted in a prism frame 52. Certain portions of the frame are shown in FIG. 8. Particularly, prism frame 52 includes protruding lip 70 which lip cooperates with the pair of capture channels 44A, 44B shown in FIGS. 2, 3.

Alternately, a tongue and groove or interference fit may be provided. The attachment mechanism mounting the movable prism lenses to frames 20 can be altered. FIG. 9 shows that prism lenses 50 can be rotated as shown in direction arrow 81 when the prism lenses 50 are mounted on a circular prism frame 80. The prism lens 50 is rectangular but the lens frame is circular, or at least the prism frame mount lip is circular. Rotation of 180 degrees of the prism and lip in the frame plane changes a downward view angle to an upward view angle.

Figure 10:
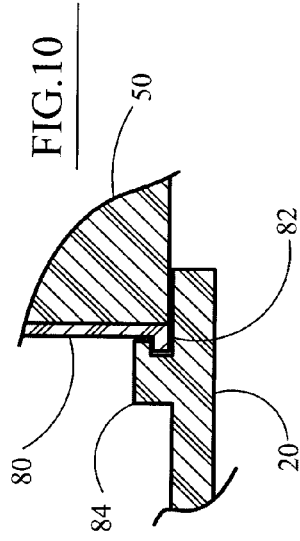
FIG. 10 diagrammatically illustrates a prism frame lip and an eyeglass channel retaining the lip.

FIG. 10 shows that prism frame 80 has an outwardly extending lip 82. Lip 82 cooperates and travels within the C-shaped channel formed by eyeglass frame mount 84. By rotating the lens 50 from the position shown by a solid line in FIG. 9 to the position shown in dashed lines such that the upper and lower surfaces of prism lens 50, that is, surfaces 51A, 51B are reversed from the solid line illustration to a broken-line reversed position (surface 51B located closer to bridge 22), the user has altered the viewing angle from 90 degrees downward to 90 degrees upward. As used herein, the term "upward" and "downward" refer to angles of view either above the eyeglass frame (referencing an upward view in the eyeglass frame plane) as compared with the opposite view when the user sees items downward with respect to the eyeglass frame.

Figure 11:
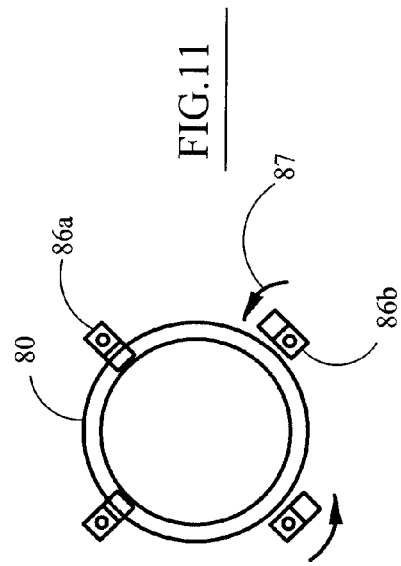
FIG. 11 diagrammatically illustrates L-shaped clips which are rotatable with respect to the glasses frame permitting removal of the prism lens and the prism frame.

FIG. 11 shows that prism frame 80 can be mounted to eyeglass frame 20 by L-shaped brackets. The brackets 86b may be rotatable as noted by movement arrow direction 87. Some of the L-shaped brackets 86a may be fixed compared with others which may be movable L-shaped brackets 86b.

Figure 12:
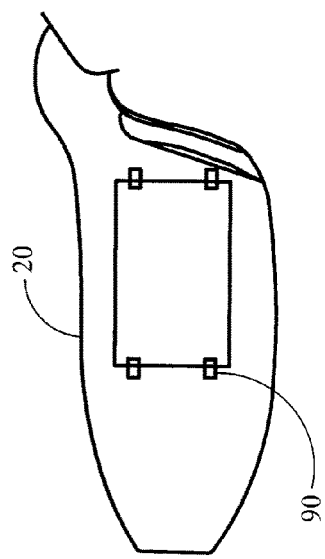
FIG. 12 diagrammatically illustrates a plurality of tabs which hold the prism frame.

FIG. 12 diagrammatically illustrates fixed L-shaped tabs 90 attached to eyeglass frame 20. In this manner, lip 70 of prism frame 52 can cooperate and slide into and out of the tabs 90 in FIG. 12. The L-shaped tabs form C-shaped channels with frame surface 42.

Figure 13:
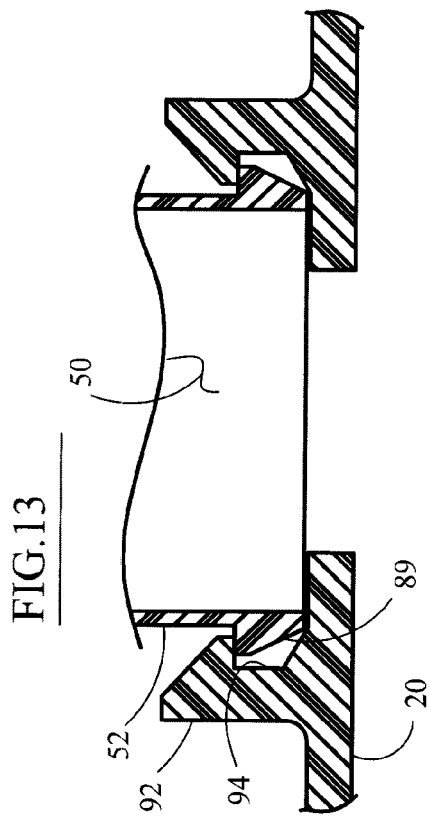
FIG. 13 diagrammatically illustrates snap and snap channel mounts (which may be replaced by detents and indents)

FIG. 13 shows a snap-in mount element 92 in the prism frame. The prism frame 92 may have outwardly protruding snaps configured as tabs 89 which snapping tabs cooperate with front protruding tabs 92 from frame 20. Opposing tapered end surfaces assist attachment and detachment. A snap channel 94 is formed beneath protruding snap tab 92 of frame 20. Snap channel 94 captures the protruding lip or tab 92 from prism frame 52.

Figure 14:
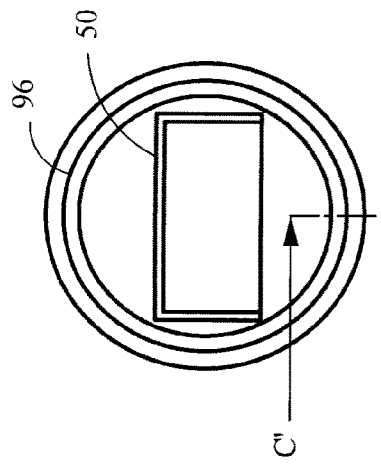
FIG. 14 diagrammatically illustrates a circular prism mount and prism lens.

FIG. 14 diagrammatically illustrates that prism lens 50 may be mounted on a round prism frame 96.

Figure 15:
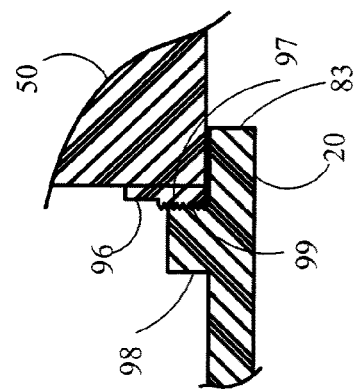
FIG. 15 diagrammatically illustrates a screw-on or threaded connection feature of the prism frame in conjunction with the eyeglass frame.

FIG. 15 is the view from section line C'-C'' in FIG. 14 and shows that prism frame 96 includes threads 97. A frame mount 98 from eyeglass frame 20, protruding from the front face of the frame, includes a plurality of threads 99. Alternatively, threads 99 may be placed on view port edge 83. The male and female threads may be reversed in FIG. 15. Likewise, lips and channels and tabs and capture channels may be reversed.

The present invention can be used by bed-ridden patients, by others who want to read in bed or view TV near the end of the bed, by industrial workers and others who view work 90 degrees disposed from a straight-on view angle, or as a military observation tool. The new prism glasses can be used with any MRI Coil and by all MRI System manufacturers. The inventive glasses are magnetically inert (containing no ferrous metal, made from magnetically inert plastic and nylon parts), and lightweight.

Prior art devices with metallic hinges, or even hinges were made of a non-ferrous material, cause image artifacts and distortion of scans of the head or brain, thereby making the prior art glasses poor candidates for fMRI which typically studies the brain.

As a military observation tool, the user could sit or lie down for long periods while wearing the prism glasses and maintain watch while scanning horizon (lying flat on back) or sitting up watching skyward. With one prism UP and the other DOWN, a field soldier or animal tracker could keep watch front and back while lying on their back, looking for any movement. An industrial use would permit a factory worker while working an assembly line, to see items upwardly disposed (at equipment) or downwardly disposed (PC Board Soldering) for long periods of time without causing neck strain.

Other uses include any situation in which a patient is in an environment where the view to the front is blocked or occluded and the situation tends to cause anxiety.

A mountain climbing instructor could use the prism glasses to view images upward without creating neck strain. A typist could look straight ahead and see manuscript on their desk as well as the keys being typed while looking straight ahead. Bicyclist could use the prism glasses to keep their head down while seeing straight ahead, maintaining minimal wind resistance, and the person could still be able to glance over the top of the spectacles to maintain a normal view when needed without fully raising head. Workers who must keep looking upward at a bridge, crane, elevator, windows, building, scaffolding, etc. could use the upward view of the prism glasses, and individuals who need to see downward (i.e. crane operator, factory workers) for long periods could rotate the prisms the opposite direction accordingly, thereby minimizing neck strain. Patient's and individuals who must lie flat on their back can use prism glasses to view TV screen that is wall mounted, whether the TV is at the foot of their bed or towards the head of their bed and the images would not be reversed The claims appended hereto are meant to cover modifications and changes within the scope and spirit of the present invention.

What is claimed is:

1. Prism glasses with movable lenses adapted to be worn by a user inside a magnetic resonance imaging or nuclear magnetic resonance imaging machine which permit the user to alter the viewing angle from substantially 90 degrees downward to substantially 90 degrees upward without adversely affecting the magnetic resonance image of the user's head from the imaging machine comprising:

an eyeglasses frame with view ports formed as apertures in a substantially planar frame plate on opposite sides of a central bridge formed in the frame plate, the bridge adapted to rest the frame plate on a user's nose, the frame plate having a front face and a rear face;

end pieces at terminal ends of the frame plate;

a pair of temples which are rotatably attached by respective hinged attachments to said end pieces and the frame plate such that opposing temples are adapted to rest on the ears of a user;

a pair of prisms adapted to transmit an image 90 degrees from an image source, each prism disposed in a respective prism frame, each prism frame having prism frame mount elements thereon to permit removable attachment and detachment of the respective prisms to and from said eyeglasses frame;

a pair of complementary mount elements disposed on said frame plate's front face about said view ports, each complementary mount element being complementary to a corresponding prism frame mount element retaining a respective prism;

wherein in a first mode of operation, each said prism transmits a downward image 90 degrees through said respective view port, with prism frame mount elements cooperating with said complementary frame plate mount elements, and in a second mode of operation, each said prism transmits an upward image 90 degrees through said respective view port with said prism frame mount elements cooperating with said complementary frame plate mount elements;

wherein the frame, end pieces, temples and end mounts are made of non-metallic plastic and the prisms are made of non-metallic plastic or glass which non-metallic plastic or glass does not adversely affect the captured magnetic resonance image of the user's head while the user wears the glasses in the imaging machine.

2. Prism glasses as claimed in claim 1 wherein said prism frame mount elements and said complementary frame plate mount elements are one of:
  a lip interlock with a channel;
  a tongue and groove;
  an interference fit between said prism frame mount elements and said complementary frame plate mount elements;
  tabs interlocking with tab lock capture channels;
  snap in tabs interlocking with capture channels;
  detents and indent interlocks; and
  interfacing threads on said prism frame mount elements and said complementary frame plate mount elements.

3. Prism glasses as claimed in claim 1 wherein said prism frame mount elements having opposing lips along opposing sides thereof and said complementary frame plate mount elements are one of:
  a pair of opposing lip interlock channels on either side of the view ports;
  a plurality of snap in tabs on the front face of the frame about said view ports;
  a pair of opposing but facing grooves to from a tongue and groove mount with said frame mount lip elements; and
  an interference fit with a plurality of protruding L-shaped tabs on the front face of the frame about said view ports.

4. Prism glasses as claimed in claim 3 wherein said prism frame lip mount elements are vertically disposed on the frame plate and said complementary frame plate mount elements are one of:
  a pair of vertically opposing lip interlock channels on either side of the view ports;
  a pair of vertically opposing but facing grooves to from a tongue and groove mount; and
  a plurality of vertically disposed protruding L-shaped tabs on the front face of the frame about said view ports.

5. Prism glasses as claimed in claim 1 wherein said prism frame mount elements having opposing lips along opposing sides thereof and said complementary frame plate mount elements are one of:
  a pair of vertically disposed, opposing lip interlock channels on either side of the view ports;
  a pair of vertically disposed, opposing but facing grooves to from a tongue and groove mount with said frame mount lip elements; and
  a plurality of vertically disposed, protruding L-shaped tabs on the front face of the frame about said view ports;
  whereby said prisms are removed from said eyeglass frames either vertically upward or vertically downward by sliding said prism frame mount elements in said complementary frame plate mount elements.

6. Prism glasses with movable lenses adapted to be worn by a user inside a magnetic resonance imaging or nuclear magnetic resonance imaging machine which permit the user to alter the viewing angle from substantially 90 degrees downward to substantially 90 degrees upward without adversely affecting the magnetic resonance image of the user's head from the imaging machine comprising:
  an eyeglasses frame with view ports formed as apertures in a substantially planar frame plate on opposite sides of a central bridge formed in the frame plate, the bridge adapted to rest the frame plate on a user's nose, the frame plate having a front face and a rear face;
  end pieces at terminal ends of the frame plate;
  a head strap adapted to wrap around the head of a user, said head strap attached to said end pieces and the frame plate such that said eyeglasses frame rests on the nose of the user;
  a pair of prisms adapted to transmit an image 90 degrees from an image source, each prism disposed in a respective prism frame, each prism frame having prism frame mount elements thereon to permit removable attachment and detachment of the respective prisms to and from said eyeglasses frame;
  a pair of complementary mount elements disposed on said frame plate's front face about said view ports, each complementary mount element being complementary to a corresponding prism frame mount element retaining a respective prism;
  wherein in a first mode of operation, each said prism transmits a downward image 90 degrees through said respective view port, with prism frame mount elements cooperating with said complementary frame plate mount elements, and in a second mode of operation, each said prism transmits an upward image 90 degrees through said respective view port with said prism frame mount elements cooperating with said complementary frame plate mount elements;
  wherein the frame, end pieces, head strap, and mount elements are made of non-metallic plastic and the prisms are made of non-metallic plastic or glass which non-metallic plastic or glass does not adversely affect the captured magnetic resonance image of the user's head while the user wears the glasses in the imaging machine.

7. Prism glasses as claimed in claim 6 wherein said prism frame mount elements and said complementary frame plate mount elements are one of:
  a lip interlock with a channel;
  a tongue and groove;
  an interference fit between said prism frame mount elements and said complementary frame plate mount elements;
  tabs interlocking with tab lock capture channels;
  snap in tabs interlocking with capture channels;
  detents and indent interlocks; and
  interfacing threads on said prism frame mount elements and said complementary frame plate mount elements.

8. Prism glasses as claimed in claim 6 wherein said prism frame mount elements having opposing lips along opposing sides thereof and said complementary frame plate mount elements are one of:
  a pair of opposing lip interlock channels on either side of the view ports;
  a plurality of snap in tabs on the front face of the frame about said view ports;
  a pair of opposing but facing grooves to from a tongue and groove mount with said frame mount lip elements; and
  an interference fit with a plurality of protruding L-shaped tabs on the front face of the frame about said view ports.

9. Prism glasses as claimed in claim 8 wherein said prism frame lip mount elements are vertically disposed on the frame plate and said complementary frame plate mount elements are one of:

a pair of vertically opposing lip interlock channels on either side of the view ports;
a pair of vertically opposing but facing grooves to from a tongue and groove mount; and
a plurality of vertically disposed protruding L-shaped tabs on the front face of the frame about said view ports.

10. Prism glasses as claimed in claim 6 wherein said prism frame mount elements having opposing lips along opposing sides thereof and said complementary frame plate mount elements are one of:
 a pair of vertically disposed, opposing lip interlock channels on either side of the view ports;
 a pair of vertically disposed, opposing but facing grooves to from a tongue and groove mount with said frame mount lip elements; and
 a plurality of vertically disposed, protruding L-shaped tabs on the front face of the frame about said view ports;
 whereby said prisms are removed from said eyeglass frames either vertically upward or vertically downward by sliding said prism frame mount elements in said complementary frame plate mount elements.

11. Prism glasses with movable lenses adapted to be worn by a user inside a magnetic resonance imaging or nuclear magnetic resonance imaging machine which permit the user to alter the viewing angle from substantially 90 degrees downward to substantially 90 degrees upward without adversely affecting the magnetic resonance image of the user's head from the imaging machine comprising:
 an eyeglasses frame with a substantially planar frame plate, a bridge centrally located in the frame plate and adapted to rest the frame plate on an user's nose, end pieces at terminal ends of the frame plate, said frame plate having a forward facing outboard face, said plate defining view ports as through passages on opposite sides of said bridge;
 several different pairs of detachable temples, each temple pair having a releasable lock end piece at one temple end and a length to fit either a large adult, a small adult or a child;
 each end piece on said frame plate having a complementary end lock element which is complementary to the corresponding releasable lock end piece on said respective temple;
 a pair of prisms adapted to transmit an image 90 degrees from an image source, each prism disposed in a respective prism frame, each prism frame having prism frame mount elements thereon to permit removable attachment and detachment of the respective prisms to and from said eyeglasses frame;
 a pair of complementary mount elements disposed about said through passages of said eyeglasses frame on said forward facing outboard face of the frame plate, each complementary mount element being complementary to a corresponding prism frame mount element retaining a respective prism;
 wherein said prism glasses have at least first and second modes of operation, in said first mode, each said prism transmits a downward image 90 degrees through said respective view port and with prism frame mount elements cooperating with said complementary frame plate mount elements, and in said second mode, each said prism transmits an upward image 90 degrees through said respective view port with said prism frame mount elements cooperating with said complementary frame plate mount elements, and in both said first and second modes, said temples being mounted on said frame plate by cooperation of respective temple lock end pieces with complementary frame plate end lock elements;
 wherein the frame, end pieces, temples and mount elements are made of non-metallic plastic and the prisms are made of non-metallic plastic or glass which non-metallic plastic or glass does not adversely affect the captured magnetic resonance image of the user's head while the user wears the glasses in the imaging machine.

12. Prism glasses as claimed in claim 11 wherein said prism frame mount elements and said complementary frame plate mount elements are one of:
 a lip interlock with a channel;
 a tongue and groove;
 an interference fit between said prism frame mount elements and said complementary frame plate mount elements;
 tabs interlocking with tab lock capture channels;
 snap in tabs interlocking with capture channels;
 detents and indent interlocks; and
 interfacing threads on said prism frame mount elements and said complementary frame plate mount elements.

13. Prism glasses as claimed in claim 11 wherein said prism frame mount elements having opposing lips along opposing sides thereof and said complementary frame plate mount elements are one of:
 a pair of opposing lip interlock channels on either side of the view ports;
 a plurality of snap in tabs on the front face of the frame about said view ports;
 a pair of opposing but facing grooves to from a tongue and groove mount with said frame mount lip elements; and
 an interference fit with a plurality of protruding L-shaped tabs on the front face of the frame about said view ports.

14. Prism glasses as claimed in claim 13 wherein said prism frame lip mount elements are vertically disposed on the frame plate and said complementary frame plate mount elements are one of:
 a pair of vertically opposing lip interlock channels on either side of the view ports;
 a pair of vertically opposing but facing grooves to from a tongue and groove mount; and
 a plurality of vertically disposed protruding L-shaped tabs on the front face of the frame about said view ports.

15. Prism glasses as claimed in claim 11 wherein said prism frame mount elements having opposing lips along opposing sides thereof and said complementary frame plate mount elements are one of:
 a pair of vertically disposed, opposing lip interlock channels on either side of the view ports;
 a pair of vertically disposed, opposing but facing grooves to from a tongue and groove mount with said frame mount lip elements; and
 a plurality of vertically disposed, protruding L-shaped tabs on the front face of the frame about said view ports;
 whereby said prisms are removed from said eyeglass frames either vertically upward or vertically downward by sliding said prism frame mount elements in said complementary frame plate mount elements.

* * * * *